June 22, 1954
L. J. HAWKINS ET AL
2,681,746
PALLET BOX UNLOADING HOPPER
Filed March 16, 1950
3 Sheets-Sheet 3
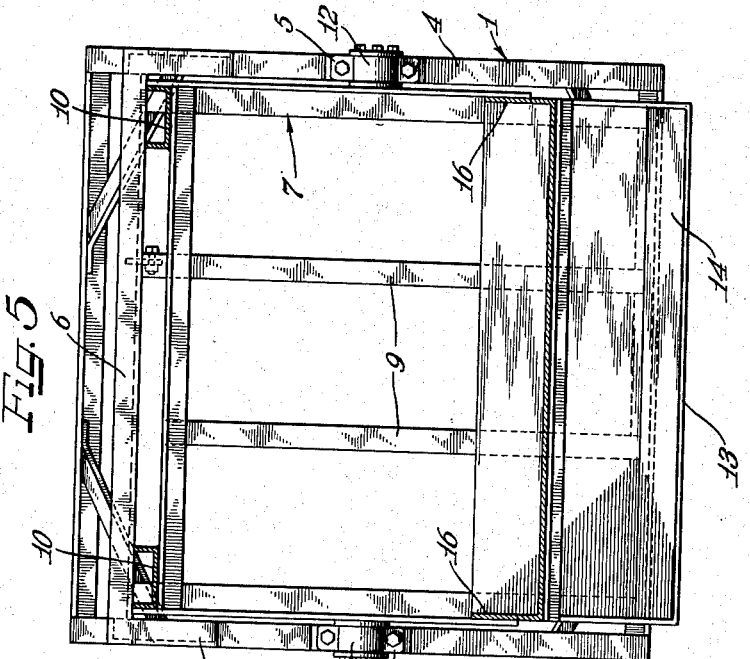
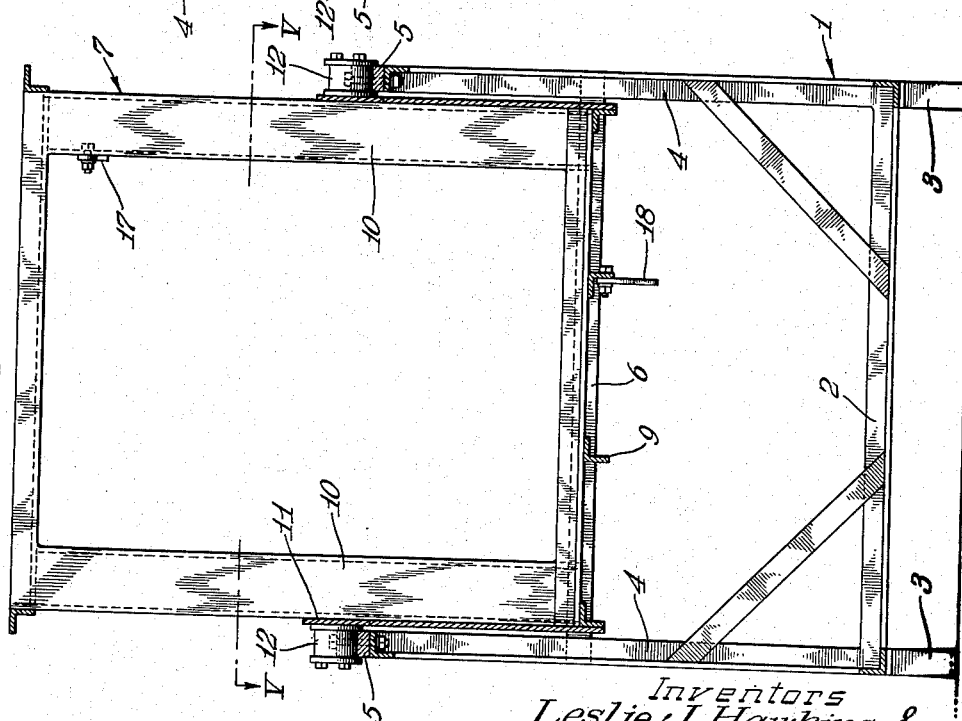
Inventors
Leslie J. Hawkins &
Casper John Zimmerman
by The Firm of Charles W. Hills, Attys Patented June 22, 1954

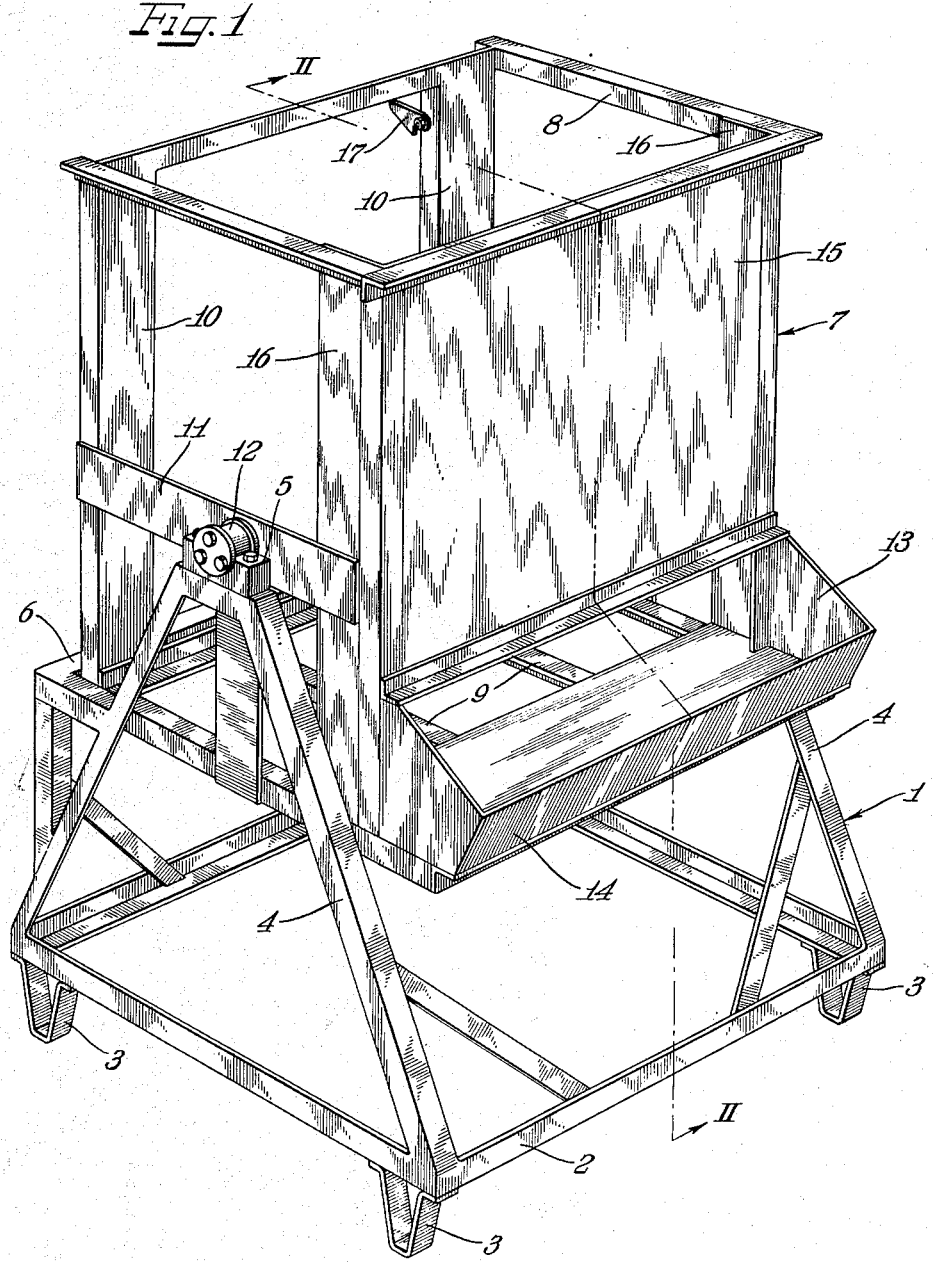

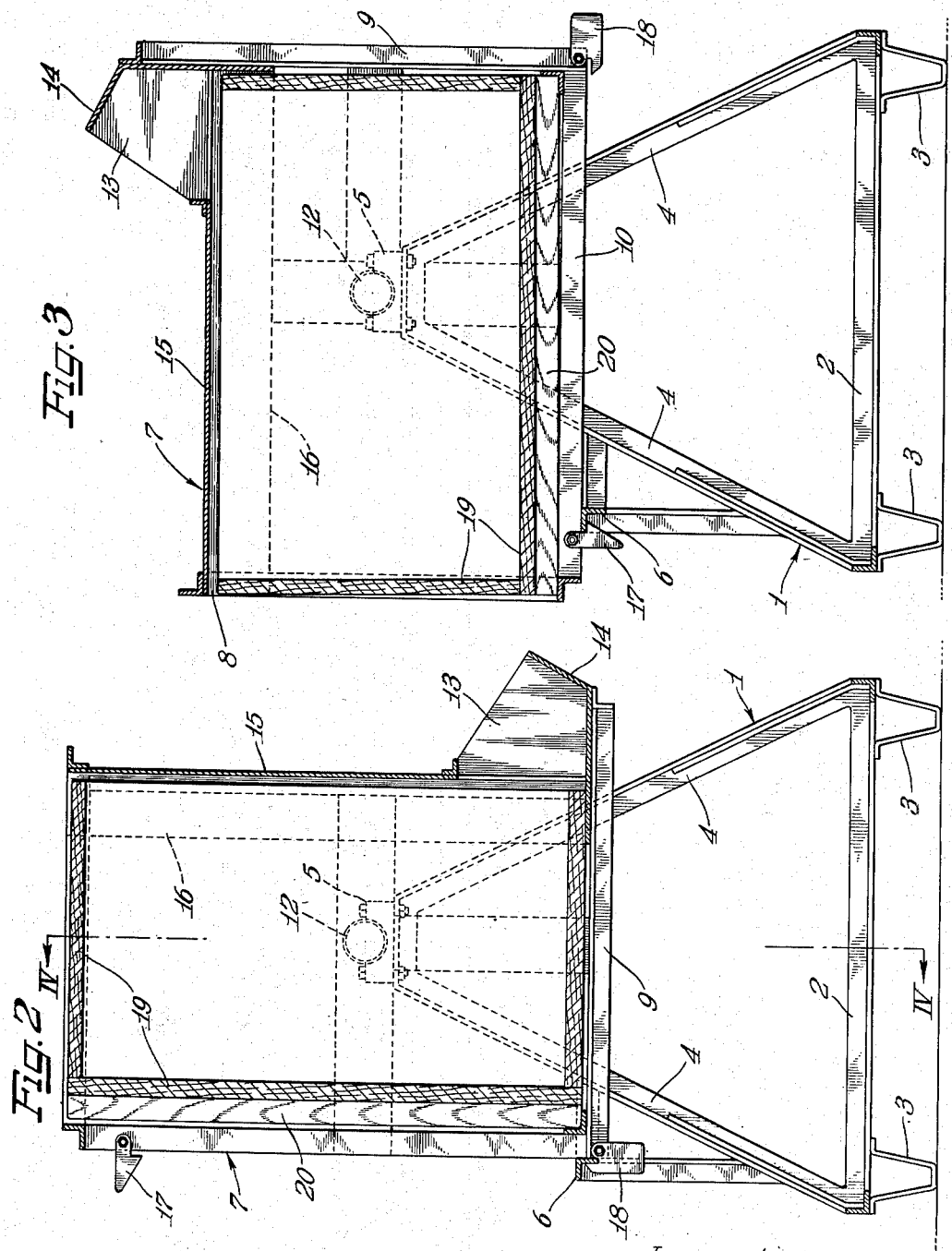

2,681,746

UNITED STATES PATENT OFFICE 2,681,746

PALLET BOX UNLOADING HOPPER

Leslie J. Hawkins, Colden, and Casper John Zimmerman, Kenmore, N. Y., assignors to Honan-Crane Corporation, Lebanon, Ind., a corporation of Indiana Application March 16, 1950, Serial No. 149,944

5 Claims. (Cl. 222—165)

This invention relates to improvements in a pallet box unloading hopper, and more particularly to a device for unloading pallet boxes and the like, especially where the box contains parts in the process of manufacture upon which further work has to be done, and such boxes are moved from one location to another inside a plant, or moved from one plant to another for further work on the parts, the unloading hopper quickly and easily unloading the pallet box and retaining the parts in an easy position of access for further work, although the invention may have other uses and purposes as will be apparent to one skilled in the art.

In the past, not only considerable difficulty but also considerable danger to the operators were experienced in the handling of pallet boxes, which are also variously known in the trade as skid bins, tote boxes, parts containers, etc. Such boxes are used to carry parts in the process of manufacture from one working location to another, whether or not such locations are in the same plant or in different plants miles apart. Heretofore it was necessary to handle these pallet boxes by hand, especially when it was desired to unload the parts from the box for the next succeeding operation on the parts. In the manual manipulation of heavy boxes, there was danger of injury to the operators, danger of injury to parts by way of spilling, and an objectionable amount of time wasted in properly disposing the box and taking parts from it in the event it were not unloaded.

With the foregoing in mind, it is an important object of this invention to provide an unloading hopper into which a pallet box may be delivered by way of a forked truck or the like, and the hopper readily and easily swung to unloading position to dump the parts into a position easily accessible by the next operator.

A further object of this invention is the provision of a pivotally mounted unloading hopper into which a pallet box may readily be disposed, and which hopper may be freely and easily pivoted by hand from loading position to unloading position.

It is also a feature of this invention to provide a pallet box unloading hopper, which is equipped with an exposed delivery trough to hold parts dumped from a pallet box in a readily available position for the operator next working upon the parts.

Still another object of this invention is the provision of an unloading hopper for a pallet box or the like, the hopper being so constructed that it will receive the loaded pallet box in one position, and easily pivoted to unloading position, retaining the pallet box as a source of supply until all parts therein gravitate into a readily accessible delivery trough, after which the hopper may be pivoted to loading position and the empty pallet box removed.

Also an object of this invention is the provision of an unloading hopper for a pallet or tote box or the like which may be simply and relatively lightly constructed by a skeleton formation, the hopper having one side thereof closed upward of a delivery trough so as to avoid spilling of parts, the closed hopper side being adjacent the open top of the pallet or tote box.

It is also a feature of this invention to provide a pivotally mounted unloading hopper for a pallet or tote box, with readily and easily operable means for latching the hopper in loading position, and latching the same in dumping position.

A further object of the invention resides in the provision of a skeleton-type dumping hopper for pallet or tote boxes, the hopper having just sufficient closure between the frame members thereof to prevent accidental spilling of parts when the tote box is dumped so as to discharge into a delivery bin or trough carried by the hopper.

While some of the more salient features, characteristics and advantages of the instant invention have been above pointed out, others will become apparent from the following disclosures, taken in conjunction with the accompanying drawings, in which—

Figure 1 is a pictorial projectional view of an unloading hopper embodying principles of the instant invention, showing the same in unloading and parts delivering position, but empty of a tote or pallet box;

Figure 2 is a central vertical sectional view taken substantially as indicated by the line II—II of Fig. 1, looking in the direction of the arrows, showing the hopper provided with a tote box;

Figure 3 is a sectional view similar in character and location to Fig. 2, but showing the hopper in loading position just after receiving a tote or pallet box therein;

Figure 4 is a transverse vertical sectional view taken substantially as indicated by the line IV—IV of Fig. 2, with the tote or pallet box removed; and Figure 5 is a plan sectional view of the hopper alone taken substantially as indicated by the line V—V of Fig. 4.

As shown on the drawings:

In the illustrated embodiment of this invention there is shown a dumping hopper assembly including a base frame or supporting structure generally indicated by numeral 1 and comprising a bottom frame portion 2 under each corner of which a ground skid 3 may be provided, it being obvious that caster wheels may be substituted for the ground skids if so desired. The supporting structure also includes a pair of opposed substantially triangular side frame portions 4—4 each of which has a flattened upper apical portion to carry a pillow block pivot bearing 5. At the rear of the structure is an outwardly projecting portion embodying a cross bar 6, preferably in the form of an angle iron. As illustrated, a supporting structure or base frame may be of the skeleton type so as to provide adequate strength and rigidity along with lightness in weight.

The supporting structure or base frame 1 is designed to pivotally support an unloading or dumping hopper generally indicated by numeral 7. This hopper is preferably of the skeleton type including corner members connected by suitable cross bars and provided with one open end as indicated at 8, and with the opposite end provided with a plurality of transverse members 9 to form a skeleton bottom. As seen best in Figs. 1 and 4, relatively wide members are preferably used at the rear of the box-like hopper to provide opposed guideways or track 10—10 to insure easy positioning of a pallet or tote box in the hopper. Intermediate the ends of the hopper opposed transverse members 11—11 are provided, secured to the end members on the respective sides of the box, and each member 11 carries an outwardly extending pivot journal 12 which preferably freely rest in the bearing sockets of the pillow bearing elements 5—5. As seen in Figs. 1, 2 and 4, the pivot journals 12—12 are disposed in the region of the center of gravity of the hopper, so that the hopper will readily respond to pressure to pivot backward and forward between the horizontal position seen in Fig. 3 and the vertical position seen in the remaining figures.

At the front or delivery side of the hopper, the hopper structure carries an open topped delivery trough or bin 13 which is provided with a solid bottom, solid end walls, and an outwardly and upwardly sloping front wall 14 to facilitate the removal of parts from the trough. Of course, the rear side of the trough is in open communication with the interior of the hopper. Above this delivery trough 13, a wall closure 15 is provided across the entire front side of the hopper and extending rearwardly from the cover plate 15 is a pair of side flanges 16—16 which need be of just sufficient depth to overlap the side walls of a pallet or tote box disposed within the hopper.

Near the open top of the hopper a latch member 17 is pivoted to one of the frame members; while near the opposite end or bottom of the hopper another latch member 18 may be pivoted to a depending flange of one of the bottom members 9, as seen clearly in Figs. 2 and 4. When the hopper is in upright or unloading position, as seen in Fig. 2, the latch member 18 is engaged with a depending flange of the angle iron cross bar 6 at the rear of the supporting structure or base frame. This latch member may be manipulated readily by hand, or may be spring urged into engaging position, as may be desired. From the position seen in Fig. 2, it is a simple expedient for an operator to release the latch 18, pivot the entire hopper rearwardly through an arc of substantially ninety degrees to horizontal or loading position, as seen in Fig. 3, whereupon the other latch member 17 engages beneath the horizontal flange of the same cross bar 6. These latch members obviously prevent accidental pivotal movement of the hopper during the loading and unloading operation.

The simple operation of the instant invention may best be described with reference to Figs. 2 and 3. Assuming at the outset that the hopper is empty, and a tote or pallet box is to be inserted and emptied, the hopper will be moved to horizontal position as seen in Fig. 3, thus leaving the open end 8 of the hopper to the rear or to the left as viewed in this figure. With the aid of a forked truck or equivalent apparatus, a tote or pallet box 19 may readily be inserted through the open end of the hopper. Such a tote box is preferably provided with teeth, or, as illustrated, with a bottom rail 20 along each side thereof, leaving the center region exposed between the rails for the reception of the forks on the lifting truck. Thus, the box may be deposited entirely inside the hopper to the position seen in Fig. 3 by manipulation of the lifting truck, and after the box is seated in the hopper, the forks of the truck may be removed and it is not necessary for the box to be manually handled, especially when loaded.

After the box has been placed in the hopper in the position seen in Fig. 3, the open top of the box being confronted by the closure wall 15 of the hopper, the latch 17 is released, and the hopper manually swung to upright or unloading position, as seen in Fig. 2. When the hopper reaches this position, the latch 18 automatically locks it in place against accidental tipping, and the parts or material contained within the tote box 19 gravitate or cascade outwardly into the delivery trough 13, the closure wall 15 and side flanges 16—16 on the hopper preventing these parts from spilling anywhere except into the trough. As the parts are easily removed from the trough by an operator for further work upon the parts, additional parts will cascade into the trough from the tote box, which box functions as a magazine until all of the parts have been removed.

Obviously, the supporting structure or base frame may be at the proper height to position the trough most advantageously for easy removal of the parts therefrom by the operators. After all the parts have been removed, it is a simple expedient to tip the hopper again into horizontal position, remove the empty tote box, and substitute a full box.

Should the hopper become out of order, for any reason, it is a simple expedient to lift the hopper entirely off the base or supporting frame since, preferably, the pivot journals 12—12 merely rest in the respective bearing sockets. Also, by virtue of that construction, various base frames, that is base frames of various heights, may be utilized with the same hopper.

From the foregoing, it is apparent that I have provided a novel unloading or dumping hopper for pallet boxes, tote boxes, and the like, whereby the hopper may be loaded without manual manipulation of the tote or pallet box, easily pivoted to unloading position, and retains the parts at a position for ready access by an operator. The entire structure is economical, long lived, and extremely simple in construction and operation.

It will be understood that modifications and variations may be effected without departing from the scope of the novel concepts of the present invention.

We claim as our invention:

1. In a tote box dumping hopper, a base, a hopper having sides and opposed ends, one of said ends being open, said hopper being pivoted to said base, means limiting the pivotal movement of said hopper between horizontal and vertical positions of the endwise axis of the hopper, an outwardly extending delivery trough on one side of said hopper near the end thereof opposite said open end, latch means to hold said hopper with its endwise axis in horizontal position for the hopper to receive a tote box through said open end, and other latch means to hold said hopper with its endwise axis in vertical position while the contents of said tote box are removed from said trough.

2. In a dumping hopper for a tote or pallet box, an upright base, a skeleton-type hopper comprising four sides and opposed ends, said hopper being pivoted intermediate its ends to said base for movement between a horizontal and vertical position, one of said ends being open to receive an open-topped tote box with its open top confronting one of said sides when the hopper is positioned with its endwise axis in horizontal position, a cover over the side of said hopper confronting the opening in said tote box, side flange covers on the sides of said hopper adjacent the first said cover of a width sufficient to overlap the side margins of said tote box, and a projecting trough communicating with the inside of said hopper below the first said cover when the hopper is positioned with its endwise axis in vertical position.

3. In a dumping hopper for a tote or pallet box, an upright base, a skeleton-type hopper comprising four sides and opposed ends, said hopper being pivoted intermediate its ends to said base for movement between a horizontal and vertical position, one of said ends being open to receive an open-topped tote box with its open top confronting one of said sides when the hopper is positioned with its endwise axis in horizontal position, a cover over the side of said hopper confronting the opening in said tote box, side flange covers on the sides of said hopper adjacent the first said cover of a width sufficient to overlap the side margins of said tote box, a projecting trough communicating with the inside of said hopper below the first said cover when the hopper is positioned with its endwise axis in vertical position, and releasable latch means to hold said hopper in both horizontal and vertical positions against accidental movement.

4. In a dumping hopper assembly, an upstanding base frame, pillow block bearing elements having upwardly open journal sockets on the upper part of said frame, a hopper for a loaded open topped pallet box, pivot journals carried by said hopper for seating in said sockets, said hopper having sides and an open end to receive said loaded box, an end opposite said open end, a projecting delivery trough at one side of said hopper adjacent said opposite end through which the contents of the box may be removed, means closing the side of said hopper above said delivery trough, and a part of said hopper forming track-like members extending lengthwise of the side of said hopper opposite the closed side for sliding reception of the bottom of said box with its open top confronting said side adjacent said delivery trough.

5. In a dumping hopper for loaded tote boxes, a supporting structure, a box-like hopper comprising sides and opposed ends and pivoted intermediate its ends to said structure, said hopper being open at one end, track-like means incorporated in said hopper along a side leading in from said open end to slidingly receive and support a loaded tote box with its open top confronting one of said sides when the hopper is disposed horizontally, a closure on the side of said hopper opposite said track side so as to be over the open top of said tote box, and an open trough below said closure when the open end of the hopper is uppermost to receive the contents of said tote box, said trough projecting outwardly from said hopper and having a sloping front wall to afford easy access to its contents.

References Cited in the file of this patent

UNITED STATES PATENTS

| Number | Name | Date |
|---|---|---|
| 352,925 | Mathews | Nov. 23, 1886 |
| 508,327 | Lippincott | Nov. 7, 1893 |
| 577,881 | Puffer | Mar. 2, 1897 |
| 579,252 | Besson | Mar. 23, 1897 |
| 616,016 | Ross | Dec. 13, 1898 |
| 780,938 | Clark | Jan. 24, 1905 |
| 1,986,864 | Tolley | Jan. 8, 1935 |
| 2,036,115 | Branch | Mar. 31, 1936 |
| 2,210,250 | Melville | Aug. 6, 1940 |
| 2,323,233 | Miller | June 29, 1943 |
| 2,345,074 | Sargent et al. | Mar. 28, 1944 |
| 2,388,111 | Berman | Oct. 30, 1945 |

FOREIGN PATENTS

| Number | Country | Date |
|---|---|---|
| 140,725 | Austria | Feb. 25, 1935 |